(12) United States Patent
Desbruslais et al.

(10) Patent No.: US 10,721,001 B2
(45) Date of Patent: *Jul. 21, 2020

(54) SUBMARINE OPTICAL CABLE SHORE LANDING APPARATUS

(71) Applicant: Neptune Subsea IP Limited, London (GB)

(72) Inventors: Stephen Desbruslais, London (GB); Alistair Hill, Leybourne (GB)

(73) Assignee: Neptune Subsea IP Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/288,573

(22) Filed: Feb. 28, 2019

(65) Prior Publication Data

US 2019/0199447 A1 Jun. 27, 2019

Related U.S. Application Data

(63) Continuation of application No. 15/996,088, filed on Jun. 1, 2018, now Pat. No. 10,263,712, which is a
(Continued)

(30) Foreign Application Priority Data

Dec. 4, 2015 (GB) .................................... 1521459.6

(51) Int. Cl.
*H04B 10/00* (2013.01)
*H04B 10/80* (2013.01)
(Continued)

(52) U.S. Cl.
CPC ......... *H04B 10/808* (2013.01); *G02B 6/4427* (2013.01); *H04B 10/032* (2013.01)

(58) Field of Classification Search
CPC ... H04B 10/808; H04B 10/032; G02B 6/4427
(Continued)

(56) References Cited

U.S. PATENT DOCUMENTS

| 6,414,405 B1 * | 7/2002 | Schesser | H02J 1/00 |
| | | | 307/100 |
| 6,731,879 B1 * | 5/2004 | Frisch | H04B 10/032 |
| | | | 340/850 |

(Continued)

FOREIGN PATENT DOCUMENTS

| EP | 0495509 A2 | 7/1992 |
| EP | 1294113 A2 | 3/2003 |

(Continued)

OTHER PUBLICATIONS

Intellectual Property Office Search Report in connection with UK Patent Application No. GB1521459.6 dated Jun. 16, 2016; 2 pages.
(Continued)

*Primary Examiner* — Mohammad R Sedighian

(57) ABSTRACT

An apparatus includes a first optical coupler configured to duplicate an optical signal carried by a first cable in a second cable and a third cable. The apparatus also includes a second optical coupler configured to combine an optical signal carried by the second cable and an optical signal carried by the third cable in the first cable. The apparatus further includes an electrical switch configured to selectively connect electrical conductors of the first, second, and third cables.

20 Claims, 2 Drawing Sheets

Related U.S. Application Data continuation of application No. PCT/GB2016/053802, filed on Dec. 2, 2016.

(51) Int. Cl.
*G02B 6/44* (2006.01)
*H04B 10/032* (2013.01)

(58) Field of Classification Search
USPC .......................................... 398/104
See application file for complete search history.

(56) References Cited

U.S. PATENT DOCUMENTS

| | | | |
|---|---|---|---|
| 6,895,187 B1 | 5/2005 | Webb | |
| 7,269,353 B2* | 9/2007 | Cordier | H04B 10/806 398/104 |
| 8,244,140 B2 | 8/2012 | Kram et al. | |
| 9,553,691 B2* | 1/2017 | Breton | H04B 10/032 |
| 10,263,712 B2* | 4/2019 | Desbruslais | G02B 6/4427 |
| 2002/0167694 A1* | 11/2002 | Feinberg | H04J 14/029 398/13 |
| 2013/0202285 A1 | 8/2013 | Lecroart et al. | |

FOREIGN PATENT DOCUMENTS

| | | |
|---|---|---|
| EP | 1841086 A1 | 10/2007 |
| EP | 2393221 A1 | 12/2011 |
| EP | 2393222 A1 | 12/2011 |
| EP | 2709284 A1 | 3/2014 |

OTHER PUBLICATIONS

International Search Report and Written Opinion in connection with International Patent Application No. PCT/GB2016/053802 dated Feb. 9, 2017, 8 pages.

\* cited by examiner

SUBMARINE OPTICAL CABLE SHORE LANDING APPARATUS

CROSS-REFERENCE TO RELATED APPLICATIONS AND PRIORITY CLAIM

This application claims priority as a continuation of U.S. patent application Ser. No. 15/996,088 filed on Jun. 1, 2018, which claims priority as a continuation of International Patent Application No. PCT/GB2016/053802 filed on Dec. 2, 2016, which claims priority to British Patent Application No. GB1521459.6 filed on Dec. 4, 2015. All of these applications are hereby incorporated by reference in their entirety.

TECHNICAL FIELD

The present invention relates to an apparatus for landing a submarine optical cable.

BACKGROUND

Submarine optical cables are used to provide high bandwidth data connections over long distances. It is often necessary for a submarine optical cable to provide electrical power, for instance to power repeaters along the cable that maintain the optical signals carried by the cable. Electrical power feed equipment (PFE) may be used to provide electrical power to the optical cable. The electrical power may be provided as direct current, since this is a more efficient method of power transmission over long distances.

The maximum potential of an electrical conductor of a subsea cable is typically limited by the breakdown voltage of the insulation between the conductor and the adjacent seawater (e.g. 12 kV or 15 kV). The power handling capacity of such a cable is therefore maximized if a positive voltage is applied at one end of the cable and a negative voltage is applied at the other end.

Shunt faults may occur, which result in a conducting path between the electrical conductor of the cable and the surrounding seawater. Such a shunt fault may be mitigated by varying the electrical potential at either end of the cable to reduce the voltage in the region of the fault, so that the voltage difference between the cable and the surrounding seawater in the region of the fault is minimal. This requirement to vary the voltage at either end of the cable is in conflict with enabling maximum power handling. Maximum power handling requires double end feeding: that a positive voltage (preferably near the breakdown voltage) is provided at one end, and a negative voltage (preferably near the breakdown voltage) is provided at the other end. Accommodating shunt faults requires sufficient voltage headroom at either end of the cable to enable the voltage in the region of the fault to be minimized.

These conflicting requirements make it difficult to engineer a solution that is reliable and which maximizes power handling (which in turn enables increased system data capacity).

SUMMARY

A solution to at least some of these problems is desirable.

According to a first aspect of the invention, there is provided an optical communications apparatus comprising: a subsea cable; first and second landing stations; a splitter/combiner unit connected to an end of the subsea cable; and first and second legs connecting the splitter/combiner unit to the first and second landing stations, respectively. Each of the subsea cable and first and second legs comprises an optical fiber configured to carry optical communications and an electrical conductor configured to carry electrical power. The splitter/combiner unit is configured to duplicate optical signals carried by the subsea cable in both the first and second legs. The first and second legs are configured to provide redundant electrical power connections to the subsea cable via the splitter/combiner unit.

The subsea cable may be a trunk cable or a branch cable.

The splitter/combiner unit may be sited in water at least 20 m, 30 m, 40 m, 50 m, 80 m, 100 m or 200 m deep. The splitter/combiner unit may be sited at least 1 km, 2 km, 5 km, 10 km, or 20 km from the shore. Most preferably, the splitter/combiner unit may be sited in water at least 50 m deep (regardless of distance from shore). Most preferably, the splitter/combiner unit may be sited at least 5 km from the shore (regardless of depth).

The splitter/combiner unit may comprise couplers connecting the optical fiber of the subsea cable to the optical fiber of the first leg and the optical fiber of the second leg. Each coupler may be a 3 dB coupler.

The splitter/combiner unit may comprise a switch configured to connect either the electrical conductor of the first leg or the electrical conductor of the second leg to the electrical conductor of the subsea cable.

The splitter/combiner unit may be configured to connect either the electrical conductor of the first leg or the electrical conductor of the second leg to the electrical conductor of the subsea cable.

The apparatus may further comprise a network communications link between the first and second landing stations.

The apparatus may further comprise power feed equipment configured to provide electrical power to the electrical conductor of the first or second leg.

The power feed equipment may be configured to detect a shunt fault in either of the first and second legs.

The power feed equipment may be configured to detect leakage current arising from a shunt fault in the second leg when the first leg is supplying power to the subsea cable and to detect leakage current arising from a shunt fault in the first leg when the second leg is supplying power to the subsea cable.

When the power feed equipment is not using the first leg to supply power to the subsea cable, the power feed equipment may be configured to provide a test voltage to the first leg and to detect leakage current arising from the test voltage due to a shunt fault in the first leg. When the power feed equipment is not using the second leg to supply power to the subsea cable, the power feed equipment may be configured to provide a test voltage to the second leg and to detect leakage current arising from the test voltage due to a shunt fault in the second leg.

The power feed equipment may be configured to respond to a shunt fault in one of the first and second legs by re-configuring to supply power to the subsea cable via the other of the first and second legs.

The splitter/combiner unit may comprise a switch configured to connect either the electrical conductor of the first leg or the electrical conductor of the second leg to the electrical conductor of the subsea cable, and the power feed equipment may be configured to re-configure the splitter/combiner unit by operating the switch.

The splitter/combiner unit may be re-configured by changing which of the first and second legs are provided with electrical power by the power feed equipment.

The apparatus may further comprise a first land cable connected to the first landing station and a second land cable connected to the second landing station. The first and second land cables may be configured to provide a dual redundant data connection to at least one land network node.

According to a second aspect, there is provided an apparatus according to the first aspect, wherein: the apparatus comprises more than two landing stations; the subsea cable comprises at least two branches; the splitter/combiner unit comprises at least one splitter/combiner unit; the first and second legs comprise first and second legs for each splitter/combiner unit; each splitter/combiner unit is configured to duplicate optical signals carried by a respective one of the branches to which it is connected in the respective first and second legs; and the first and second legs for each splitter/combiner unit are configured to provide redundant electrical power connections to the respective branch via that splitter/combiner unit.

Where the apparatus comprises multiple branches, a splitter/combiner unit and dual redundant legs may be provided for one or more of the landing points of the branches.

According to a third aspect, there is provided an optical system comprising a first apparatus according to the first aspect and a second apparatus according to the first aspect. The subsea cable of the first apparatus is the subsea cable of the second apparatus. The splitter/combiner unit of the first apparatus is at a first end of the subsea cable. The splitter/combiner unit of the second apparatus is at a second end of the subsea cable.

The power feed equipment of the first apparatus may be configured to provide a positive voltage polarity, and the power feed equipment of the second apparatus may be configured to provide a negative voltage polarity.

According to a fourth aspect, there is provided an optical communications apparatus comprising a splitter/combiner configured to be coupled to first, second, and third cables. The splitter/combiner comprises optical couplers configured to (i) duplicate optical signals carried by an optical fiber of the first cable in an optical fiber of the second cable and an optical fiber of the third cable and (ii) combine optical signals carried by the optical fiber of the second cable and the optical fiber of the third cable in the optical fiber of the first cable. The splitter/combiner also comprises an electrical switch configured to selectively connect one of an electrical conductor of the second cable or an electrical conductor of the third cable to an electrical conductor of the first cable.

As the skilled person will understand, fibers for communications are typically paired to provide for bi-directional communication. The term "a fiber" may accordingly be replaced with "a fiber pair" in some embodiments of the invention.

The splitter/combiner unit may comprise a first port for connection to the subsea cable and second and third ports for connection to the first and second legs, respectively. There may be an identical number of fibers (or fiber pairs) connected to the splitter/combiner unit at each of the first, second and third ports.

The apparatus may be configured such that only two of the first, second and third ports are provided with electrical power at any one time.

BRIEF DESCRIPTION OF THE DRAWINGS

Embodiments of the invention will now be described, with reference to the accompanying drawings, in which.

DETAILED DESCRIPTION

Figure 1:
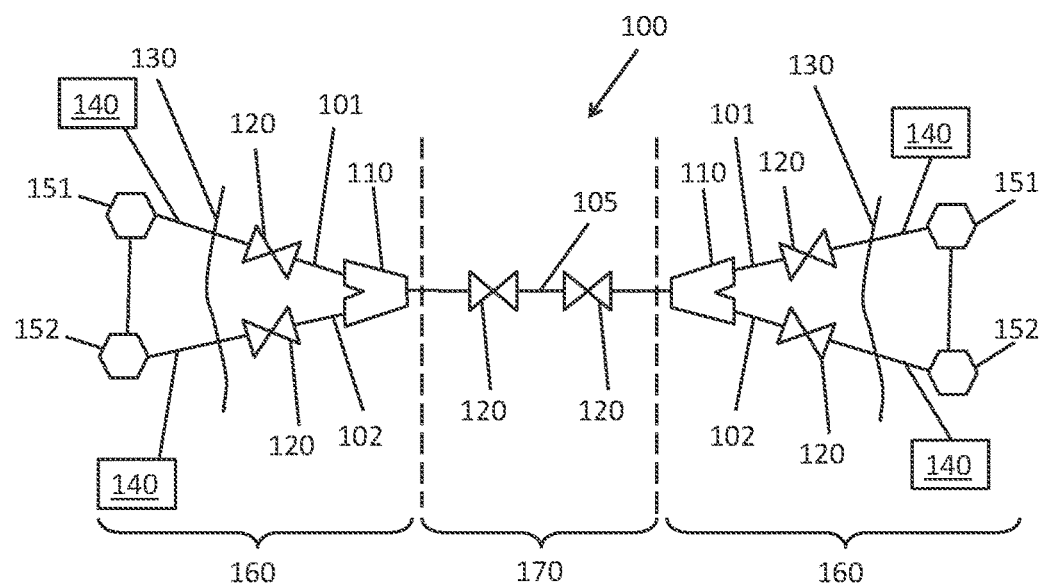
FIG. 1 is a schematic of an optical system according to an embodiment.

Referring to FIG. 1, an optical apparatus 100 is shown. The optical apparatus 100 comprises a cable region 170, comprising a subsea cable 105. The subsea cable 105 comprises a cable that includes a plurality of optical fibers for carrying communications signals. Repeaters 120 are provided at intervals along the cable 105 to maintain signal power and quality in the optical fibers.

The apparatus 100 further comprises two end regions 160 at the first and second ends of the cable 105. The two end regions 160 comprise the same set of features, configured in a similar way. Each end region 160 comprises a splitter/combiner 110, first and second legs 101, 102 and first and second landing stations 151, 152. A communications link may be provided between the first and second landing stations 151, 152 so that any problems in receiving communications at one landing station are communicated to the other landing station. The communications link may be suitable for diverting communications (from the cable) from one landing station to another.

The splitter/combiner 110 connects the cable 105 to each of the first and second legs 101, 102. The first leg 101 connects the splitter/combiner 110 to the first landing station 151, and the second leg 102 connects the splitter/combiner 110 to the second landing station 152. The location of the shore is indicated by 130.

The first and second legs 101, 102 each comprise a cable with a plurality of optical fibers, and the splitter/combiner 110 is configured to couple optical signals from each optical fiber of the cable 105 into a corresponding optical fiber in each of the first and second legs 101, 102. The first and second legs 101, 102 thereby provide for a dual redundant optical communication path from the subsea cable 105 to landing terminals 151, 152.

Repeaters 120 may be provided in the first and/or second legs 101, 102 where appropriate, for example where the first and/or second legs 101, 102 are long.

Furthermore, the first and second legs 101, 102 each comprise an electrical conductor, suitable for supplying the cable 105 with electrical power. Power feed equipment 140 is provided for supplying electrical power to the cable 105 via either of the first and second legs 101, 102. The first and second legs 101, 102 thereby provide for a dual redundant electrical power supply to the subsea cable 105.

The splitter/combiner 110 may be located in relatively deep water and/or may be relatively far offshore (e.g. more than 50 m deep, and/or more than 8 km offshore). The splitter/combiner 110 may be located away from where trawler and anchor hits are likely. The prospect of damage to either of the splitter/combiner 110 or the cable 105 may thereby be minimal. Statistics suggest that over 80% of damage to subsea communications cables arises in shallow water (for example as a result of fishing operations or dragging anchors).

Embodiments of the present invention provide for redundancy so that, in the event of a fault on either of the first or second leg 101, 102, the subsea cable 105 continues to receive electrical power from the other leg 101, 102, and any interruption of communication to shore is minimal.

Submarine communication systems are often constrained by available power. The capacity of a submarine communication system may therefore scale with available power. The power delivered by an electrical conductor is proportional to the square of the potential difference driving current through the conductor. As noted above, a maximum voltage (relative to ground) is imposed by the breakdown voltage of the insulation around the electrical conductor. In the context of submarine communications systems, it is therefore highly advantageous to provide electrical current through a subsea cable by providing a positive voltage at one end (relative to ground) and a negative voltage at the other end (relative to ground). This may be termed "double end feeding".

Embodiments of the present invention allow double end power feeding while still enabling the system to respond to a shunt fault.

In the event of a shunt fault occurring in either of the first leg 101 or second leg 102 (resulting in a current short circuit between the conductor and the sea), the system can reconfigure to supply electrical power using the other leg 101, 102.

In some embodiments, the first leg 101 may be a primary leg, which provides electrical power to the cable 105 (via the splitter/combiner 110) in normal operation (prior to a fault). In the event of a fault in the first leg 101, the power feed equipment 140 may detect the fault. The power feed equipment 140 may be configured to remove or reduce the electrical feed voltage applied to the first leg 101 and to instead provide electrical power via the second leg 102. In such an arrangement, the power feed equipment 140 may be configured to ensure that only one of the first leg 101 and second leg 102 carries electrical power at any given time. This approach enables the electrical conductor of the first leg 101 and second leg 102 to have a fixed electrical connection to the electrical conductor of the cable 105. Such fixed electrical connections avoid the need for high voltage switch gear in the splitter/combiner 110, enhancing reliability and reducing cost. Furthermore, the risk of hydrogen generation at the splitter/combiner 110 may be reduced substantially, which can be problematic at junctions between three electrically powered cables (by only powering one leg at any given time).

The power feed equipment 140 may be configured to detect faults in an unpowered leg. The power feed equipment 140 may be configured to provide a test voltage to an unpowered leg. The test voltage may be lower than the voltage required to provide power to the cable, and may be, for example, less than 1000V, 500V, 400V, 200V, 100V, 50V, 20V or 10V. The power feed equipment 140 may be configured to detect a leakage current resulting from a shunt failure in the unpowered leg. This may be useful because such a failure may otherwise not be detected until the unpowered leg is required (for instance due to a failure in the powered leg).

Figure 4:
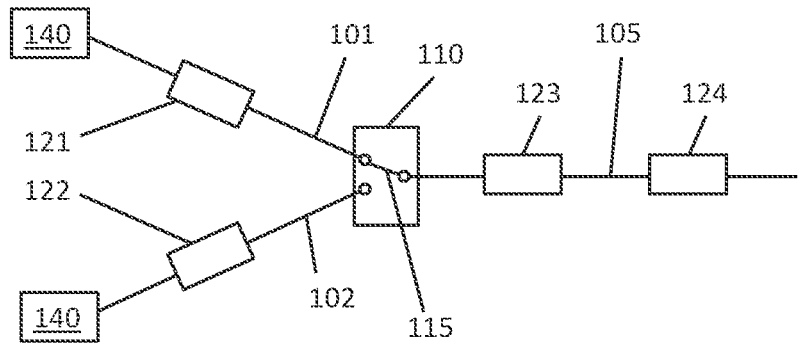
FIG. 4 is a schematic of a system with power feed equipment switching, showing power to only one of two redundant legs, in accordance with an embodiment.

Referring to FIG. 4, in some embodiments, the splitter/combiner 110 may comprise an electrical switch 115 for controlling which of the first and second legs 101, 102 is electrically connected to the cable 105. In the example of FIG. 4, the first leg 101 comprises a first repeater 121, and the second leg 102 comprises a second repeater 122. The power feed equipment comprises a power feed equipment unit 140 associated with each of the first and second legs 101, 102.

In this example, the first leg 101 may be the primary leg, and the switch 115 may be normally in the position shown in FIG. 4. When a fault is detected by the power feed equipment in the first leg 101, the power feed equipment units 140 may stop feeding power to the first leg 101 and start feeding power to the second leg 102 at the same time as switching the switch 115 to connect the second leg 102 to the cable 101.

The cable 105 may comprise first and second repeaters 123, 124 (and may comprise more repeaters, not shown), that are powered by the electrical supply to the cable 101.

Figure 3:
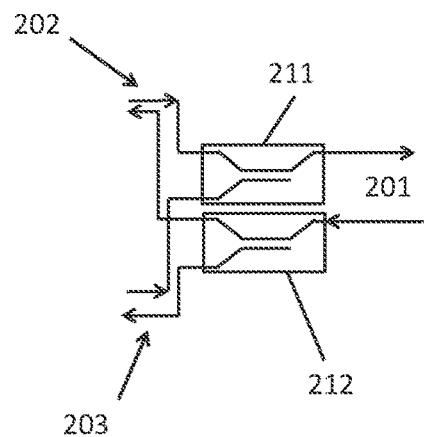
FIG. 3 is a schematic of a coupler/splitter arrangement per fiber pair according to an embodiment.

FIG. 3 shows a suitable arrangement of optical couplers for coupling optical signals carried by a pair of cable optical fibers 201 into optical fibers of the first leg 202 and second leg 203. A first 3 dB coupler 211 is arranged to combine the optical signals propagating from the first and second leg toward the cable, and a second 3 dB coupler 212 is arranged to split the optical signals propagating from the cable toward the first and second legs. As is well known in the art, a 3 dB coupler is one that splits power from an input port equally between two output ports or combines power equally from two input ports at an output port.

An arrangement with couplers avoids the need for optical switching in the splitter/combiner, reducing cost and improving reliability.

Figure 2:
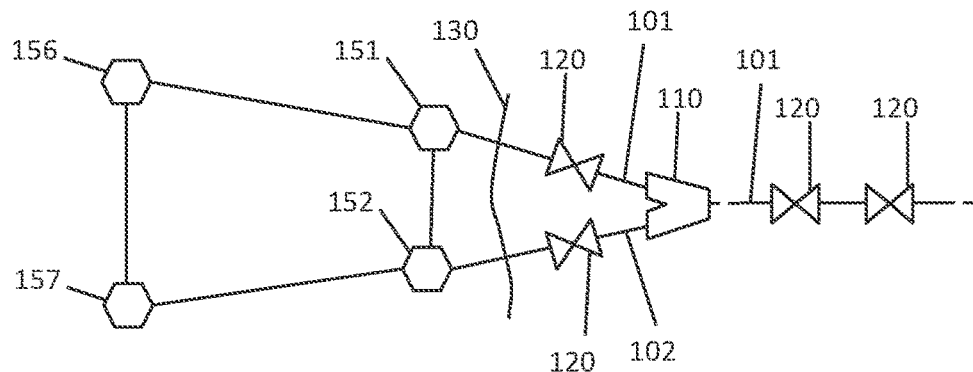
FIG. 2 is a schematic of an optical system including a backhaul network according to an embodiment.

The dual redundant communications architecture may be extended to include land-based network nodes as shown in FIG. 2. This example embodiment includes an end of the embodiment of FIG. 1 and further comprises land-based nodes 156, 157. Dual redundant data connections may be provided via the first or second leg 101, 102 to each land-based node 156, 157 so that faults in the communications links between the landing stations 151, 152 and the land-based nodes 156, 157 do not result in an interruption of communication. For instance, if the link between the first land-based node 156 and the landing station 151 associated with the first leg 101 fails, the first land-based node 156 may continue to receive communications via the network connection to the second land-based node 157.

Embodiments of the invention facilitate increased capacity in a submarine network by facilitating double end power feeding without the concomitant potential for single point shunt failures to cause a failure of the entire network. A single point failure in shallow water/near the shore can be tolerated by embodiments of the present invention without significant communications interruption. Since the capacity of a submarine network increases with the square of the potential difference applied by the power feed across the system, embodiments enable a quadrupling of network capacity by facilitating double end feeding under circumstances where reliability would otherwise take precedence.

In some embodiments, the system may comprise more than two landing stations. For example, at least one branching unit may be provided that lands at least some optical fibers of a subsea cable at different landing stations via a plurality of separate branches. At least one splitter/combiner unit may be provided. First and second legs may be provided for each splitter/combiner unit. Each first and second leg may comprise an optical fiber for carrying optical communications and an electrical conductor for carrying electrical power. Each splitter/combiner unit may be configured to duplicate optical signals carried by the respective branch to which it is connected in the respective first and second legs. Each first and second leg may be configured to provide redundant electrical power connections to the respective branch via the respective splitter/combiner unit.

Although a number of example embodiments have been described, a number of variations and modifications will be apparent, which are intentionally within the scope of the appended claims.

What is claimed is:

1. An apparatus comprising:
   a first optical coupler configured to duplicate an optical signal carried by a first cable in a second cable and a third cable;
   a second optical coupler configured to combine an optical signal carried by the second cable and an optical signal carried by the third cable in the first cable; and
   an electrical switch configured to selectively connect electrical conductors of the first, second, and third cables.

2. The apparatus of claim 1, further comprising:
   a first port configured to be connected to the first cable;
   a second port configured to be connected to the second cable; and
   a third port configured to be connected to the third cable.

3. The apparatus of claim 2, wherein the apparatus is configured such that only two of the first, second, and third ports are provided with electrical power at any given time.

4. The apparatus of claim 1, wherein the electrical switch is configured to selectively connect one of the electrical conductor of the second cable or the electrical conductor of the third cable to the electrical conductor of the first cable.

5. The apparatus of claim 1, wherein each of the first and second optical couplers comprises a 3 dB coupler.

6. The apparatus of claim 1, wherein each of the first, second, and third cables comprises a plurality of optical fibers.

7. A system comprising:
   first, second, and third cables configured to transport optical signals;
   a first optical coupler configured to duplicate an optical signal carried by the first cable in the second cable and the third cable;
   a second optical coupler configured to combine an optical signal carried by the second cable and an optical signal carried by the third cable in the first cable; and
   an electrical switch configured to selectively connect electrical conductors of the first, second, and third cables.

8. The system of claim 7, wherein:
   the first cable comprises a subsea cable; and
   the second and third cables comprise cables configured to be coupled to landing stations.

9. The system of claim 7, further comprising:
   power feed equipment configured to provide electrical power to the electrical conductor of the second cable or the electrical conductor of the third cable.

10. The system of claim 9, wherein the power feed equipment is configured to detect a shunt fault in either of the second cable or the third cable.

11. The system of claim 9, wherein the power feed equipment is configured to respond to a shunt fault in one of the second cable or the third cable by re-configuring to supply power via the other of the second cable or the third cable.

12. The system of claim 9, wherein each of the first, second, and third cables comprises a plurality of optical fibers.

13. The system of claim 7, further comprising:
    a first port configured to be connected to the first cable;
    a second port configured to be connected to the second cable; and
    a third port configured to be connected to the third cable.

14. The system of claim 7, wherein the electrical switch is configured to selectively connect one of the electrical conductor of the second cable or the electrical conductor of the third cable to the electrical conductor of the first cable.

15. The system of claim 7, wherein each of the first and second optical couplers comprises a 3 dB coupler.

16. A method comprising:
    duplicating an optical signal carried by a first cable in a second cable and a third cable using a first optical coupler;
    combining an optical signal carried by the second cable and an optical signal carried by the third cable in the first cable using a second optical coupler; and
    selectively connecting electrical conductors of the first, second, and third cables using an electrical switch.

17. The method of claim 16, further comprising:
    coupling a first port to the first cable;
    coupling a second port to the second cable; and
    coupling a third port to the third cable.

18. The method of claim 17, further comprising:
    providing electrical power to only two of the first, second, and third ports at any given time.

19. The method of claim 16, wherein the electrical switch selectively connects one of the electrical conductor of the second cable or the electrical conductor of the third cable to the electrical conductor of the first cable.

20. The method of claim 16, wherein each of the first and second optical couplers comprises a 3 dB coupler.

* * * * *